United States Patent [19]

Jacobs

[11] 3,825,701

[45] July 23, 1974

[54] ARRANGEMENT AND METHOD FOR DETECTING FAULTS IN A SWITCHING NETWORK

[75] Inventor: Melvin A. Jacobs, Hinsdale, Ill.

[73] Assignee: GTE Automatic Electric Laboratories, Incorporated, Northlake, Ill.

[22] Filed: May 4, 1973

[21] Appl. No.: 357,310

[52] U.S. Cl. .......................................... 179/175.23

[51] Int. Cl. .......................................... H04m 3/24

[58] Field of Search. 179/175.2 R, 175.21, 175.2 C, 179/175.23

[56] References Cited

UNITED STATES PATENTS

| | | | |
|---|---|---|---|
| 3,299,220 | 1/1967 | Wedmore | 179/175.2 R |
| 3,626,383 | 12/1971 | Oswald | 179/175.2 R |
| 3,691,309 | 9/1972 | Gartner et al. | 179/175.2 C |

*Primary Examiner*—Kathleen H. Claffy
*Assistant Examiner*—Douglas W. Olms
*Attorney, Agent, or Firm*—R. J. Black

[57] ABSTRACT

This invention relates to a marker used to detect faults within the switching network, prior to a cross matrix path being established, but after an idle path as been selected. The selected path is subjected to various tests including a foreign potential check, a multi-path (shorted leads) check, a shorted diode test, open diode test, a pull check, a hold check and a transmission continuity test. If any one or more of these tests fail, the marker will not use the path, will report the trouble and then select another path.

17 Claims, 4 Drawing Figures

ARRANGEMENT AND METHOD FOR DETECTING FAULTS IN A SWITCHING NETWORK

This invention relates to a marker controlled communication switching system and, more particularly, to the arrangement and methods used by the marker to detect faults in the switching network of the system.

In the No. 1 XPT System manufactured by GTE Automatic Electric Inc., incoming trunks are terminated on the primary bay of the trunk link frames (TLF) which contain the A and B stages of a crosspoint matrix or switching network. The outgoing trunks are terminated on the secondary bay of the office link frames (OLF) which contain the C and D stages of the crosspoint matrix. The outlets of the B stage are coupled to the inlets of the C stages by means of junctors. Cross matrix paths between trunks connected to the inlets and outlets of the matrix or switching network are established by a marker within the system.

Due to the nature of the crosspoint matrix or switching network, faults within the matrix, if undetected and reported, will cause serious degradation of the matrix and customer complaints. It is therefore necessary to insure the customer a trouble-free cross matrix path through the matrix and to eliminate the possibility of double connections.

Accordingly, it is an object of the present invention to provide an improved arrangement and methods for detecting faults in the switching network.

In accordance with the invention, the marker is used to detect faults within the switching network, prior to a cross matrix path being established, but after an idle path has been selected. The selected path is subjected to various tests including a foreign potential check, a multi-path (shorted leads) check, a shorted diode test, open diode test, a pull check, a hold check and a transmission continuity test. If any one or more of these tests fail, the marker will not use the path, will report the trouble and then select another path.

The invention accordingly comprises the several steps and the relation of one or more of such steps with respect to each of the others thereof, which will be exemplified in the method hereinafter disclosed, and the scope of the invention will be indicated in the claims.

Figures 1, 4:
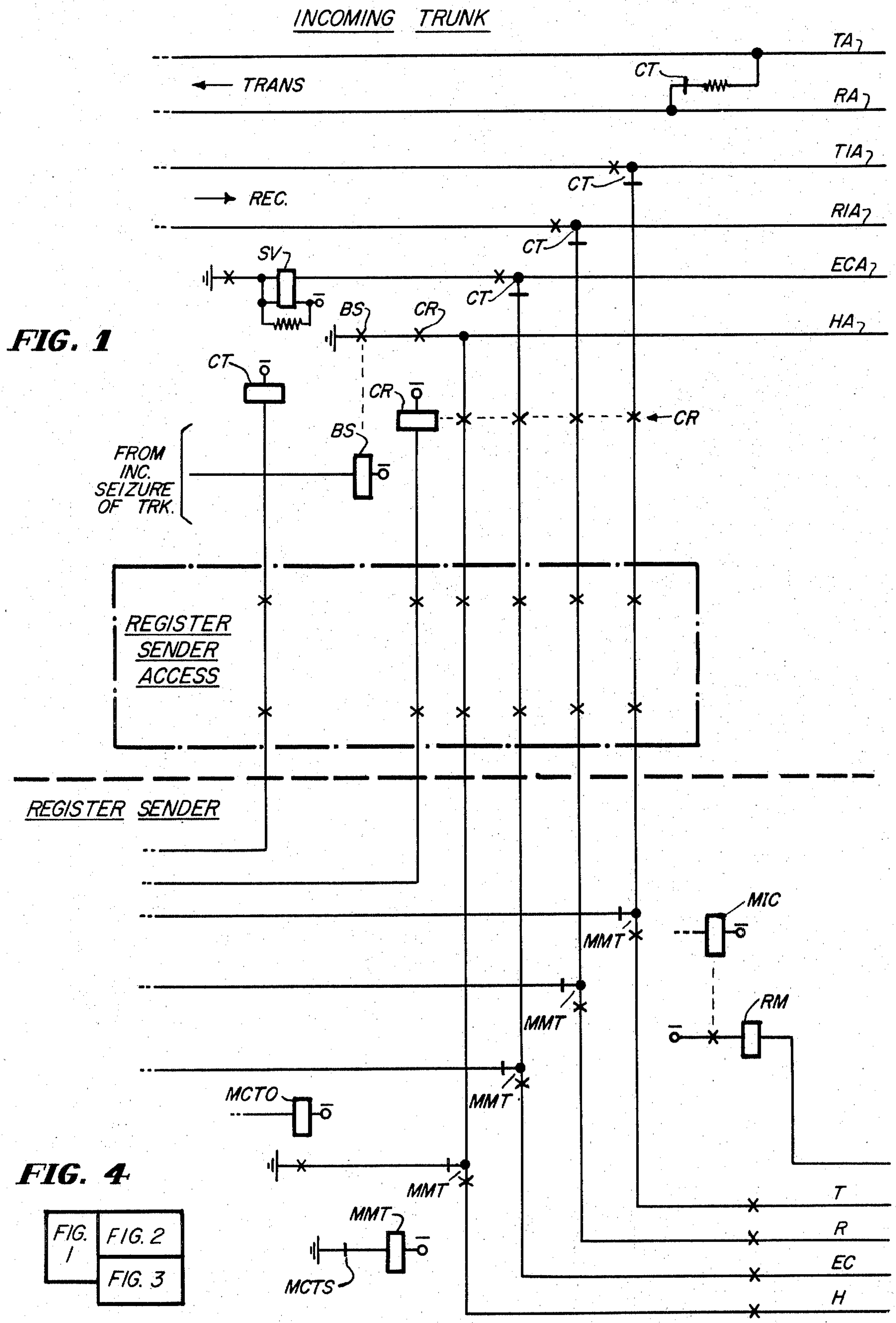
Figure 2:
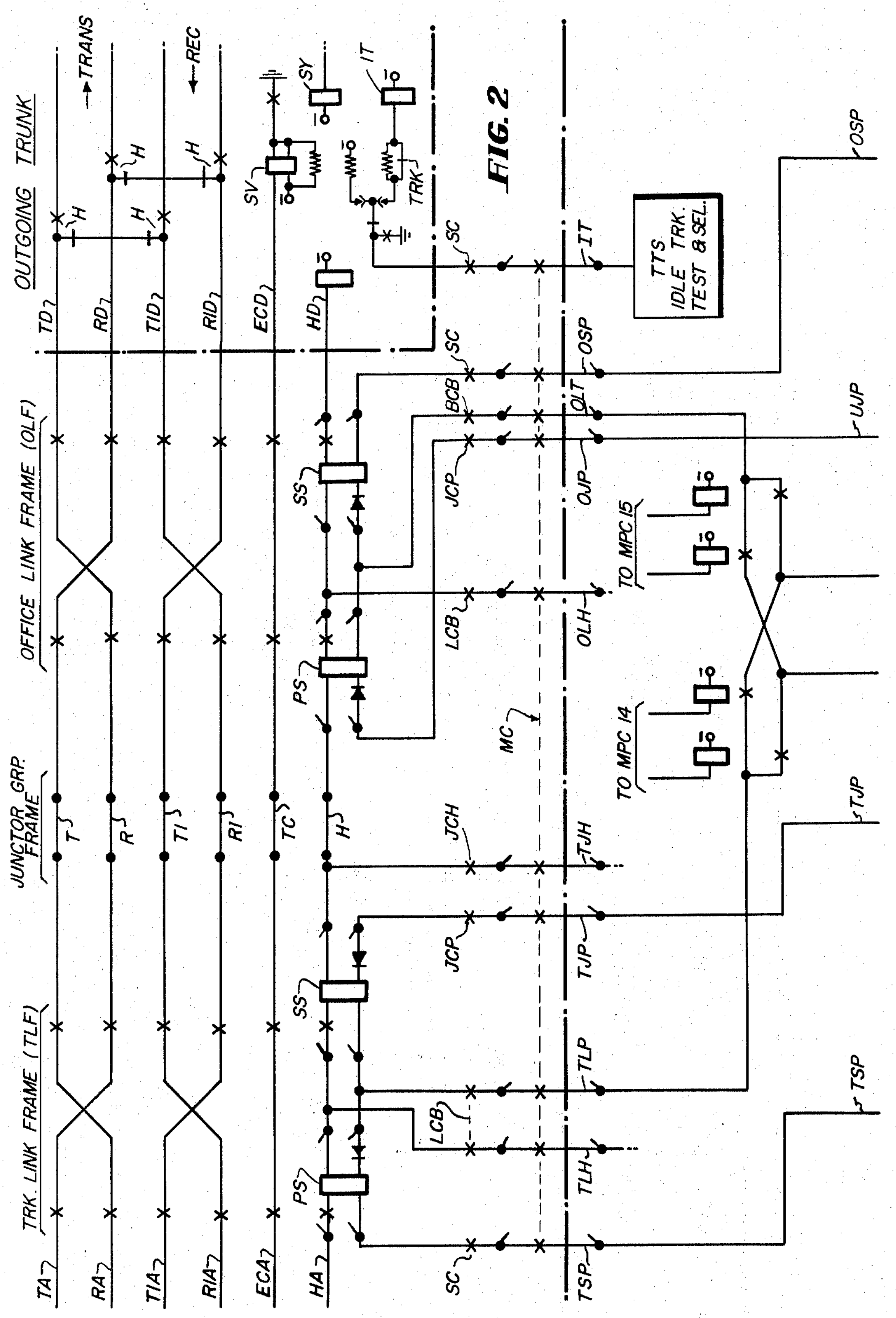
Figure 3:
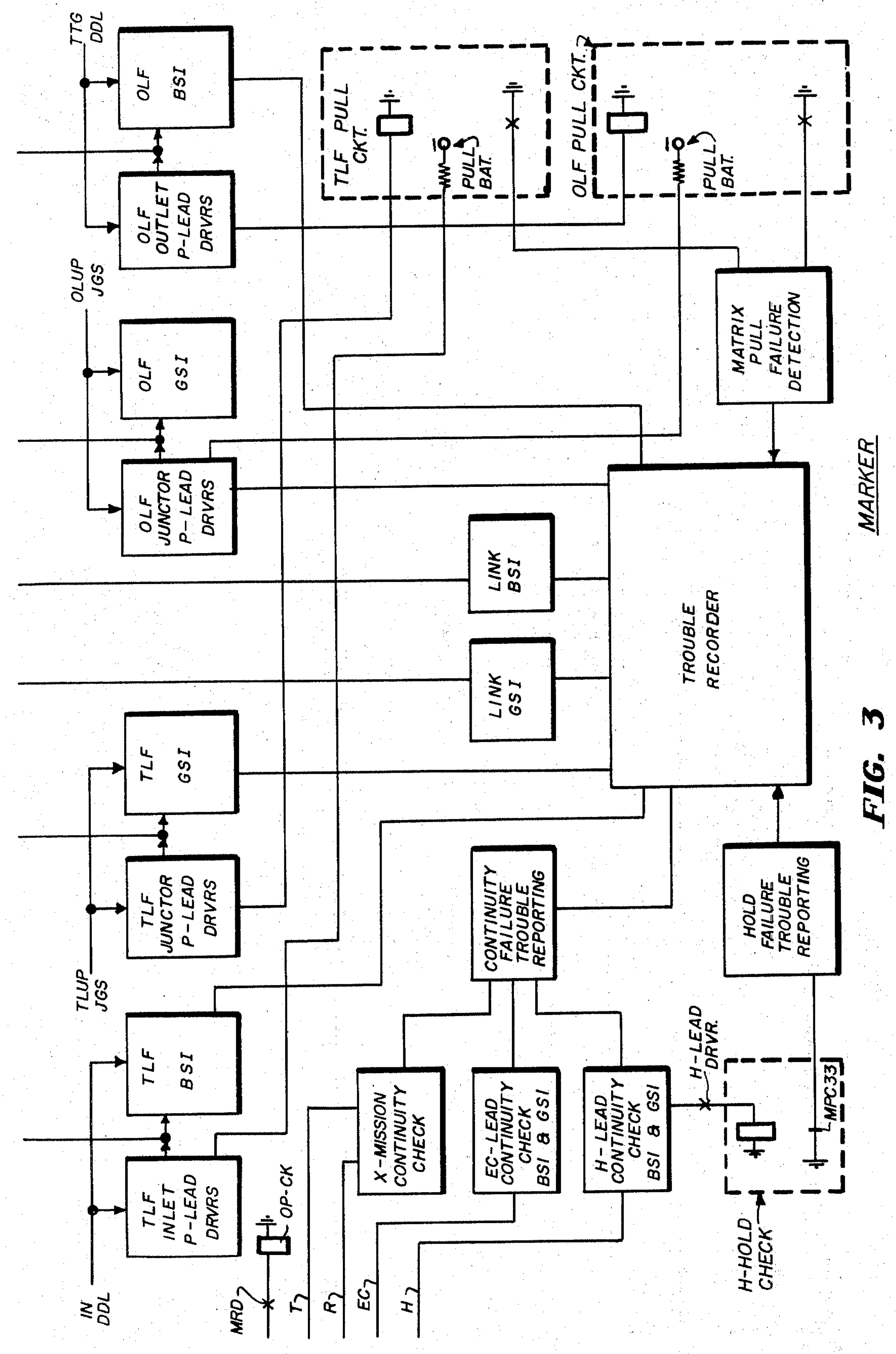

For a fuller understanding of the nature and objects of the invention, reference should be had to the following detailed description taken in connection with the accompanying drawings, in which:

FIGS. 1–3 when assembled as shown in FIG. 4 illustrates the arrangement for detecting and reporting faults within the switching network, according to the present invention; and FIG. 4 shows how FIGS. 1–3 are arranged.

Similar reference characters refer to similar parts throughout the several views of the drawings.

Referring now to the drawings, in the No. 1 XPT system, the incoming trunks are terminated on the primary bay of the trunk link frames (TLF) which contain the A and B stages of the crosspoint matrix or switching network. The outgoing trunks are terminated on the secondary bay of the office link frames (OLF) which contain the C and D stages of the crosspoint matrix or switching network. The junctor grouping frame is comprised of junctors which are transmission and signaling leads connecting an outlet (B stage) of any TLF to an inlet (C stage) of any OLF. A group of junctors that interconnect any one TLF and OLF comprises a junctor group. The connections consisting of transmission and signaling leads between the primary and secondary switches (A and B stages) of a TLF are trunk links, and those between the primary and secondary switches (C and D stages) of an OLF are office links. A set of links and a junctor connected in series by operated crosspoints to form a transmission and signalling path between inlet and outlet of the switching network is a cross matrix path.

Connect circuitry is provided in the TLF and the OLF to permit the markers to access the P, H and IT leads associated with the switches in these bays for the purpose of testing for, selecting and the pulling of a cross matrix path between an incoming trunk and an idle outgoing trunk. The connect circuitry is a two stage array which will permit any one out of five markers to access the group of test and pull leads associated with any switch or switches in a bay or frame.

The first stage of this array is called the frame connect circuitry and serves to common down the groups of switch, link and junctor leads to the second stage or marker connect stage of the array. The marker connect circuitry permits any one of five markers to access the frame connect commons.

The TLF frame connect circuitry consists of four functions: switch, link, junctor connect and junctor connect selection. The switch connect function provides a means of connecting the ten inlet P leads TSP of each of the 10 primary switches (PS) to the marker connects (MC) on a one-switch-at-a-time basis. Ten sets of contacts (SC), each individually controlled by the markers, are provided. A marker connected to this frame will operate one set of these contacts SC to connect the inlet P leads TSP of the selected switch to the marker.

The trunk link connect function provides a means of connecting the 20 P leads TLP and the 20 H leads (outlets) TLH of each of the 10 primary switches PS to a marker connect highway. 10 sets of 40 contacts (LCB) are provided. Each set is individually controlled by the markers. A marker connected to this frame will operate one set of these contacts LCB to connect the outlet P and H leads (TLP and TLH) of a selected switch to the marker.

The junctor connect function provides a means of connecting twenty outlet H leads TJH (one from the same numbered outlet of each of the 20 secondary switches SS) and the 10 outlet P leads TJP of each of the 20 secondary switches SS to a marker connect highway. 10 sets of 20 contacts JCH each are provided by the H leads TJH and 20 sets of 10 contacts JCP for the P leads. A marker will select and operate one set of each of these two sets of contacts to connect the required H and P leads to the marker.

The junctor connect selection function provides the markers with a means of selecting which junctor H lead connect correeds to operate on a particular call and office configuration.

The marker connect function is provided on a per marker basis (for up to five markers) and provides a means of connecting the markers on a one-at-a-time basis to the frame connect functions. Each marker's 200 lead marker TLF connect highway is multipled to its marker connect relays MC in each TLF. A marker will connect to a particular TLF by operating its marker connect relays MC in that frame. This action will close the marker's TLF connect highway to the selected frame. This action permits the marker to then operate the frame connect relays in the frame. The operation of the relays MC also signals the other markers that the frame is busy and closes resistance ground to the frame H leads.

The OLF connect circuitry also consists of four functions: switch, link, junctor connect and junctor connect selection. The switch connect function provides a means of connecting the 10 outlet P leads OSP of each of the 10 secondary switches SS and the 10 outlet IT leads of each of 10 vertical trunk test groups to a marker connect highway. The IT leads in each trunk test group are connected to like numbered outlets in each of the 10 secondary switches. 10 sets of 10 contacts SC each are provided for both the IT and P leads. Each set is individually controlled by the markers. A marker connected to this frame will operate one set of IT connect contacts to select an idle outgoing trunk and then operate one set of P connect contacts to access the P lead of the switch and outlet to which the selected trunk is connected.

The office link connect function provides a means of connecting the 20 P lead OLP and the 20 H leads OLH (inlet) of each of the 10 secondary switches to a marker connect highway. 10 sets of 40 contacts LCB each are provided. Each set is individually controlled by the markers. A marker connected to this frame will operate one set of these contacts to connect the selected secondary switch inlet P and H leads (OLP and OLH) to the marker.

The junctor connect function provides a means of connecting 10 inlet P leads OJP of each of 10 primary switches PS to a marker connect highway. 10 sets of 10 contacts JCP each are provided for the P leads. A marker will select and operate one set of these contacts to connect the required P leads to the marker.

The junctor connect selection function provides the markers with a means of determining the TLF secondary switch and the OLF primary switches selected for use on a particular call.

The marker connect function is provided on a per marker basis (for up to five markers) and provides a means, on a one-at-a-time basis, of connecting the markers to the frame connect functions. Each marker's 200 lead OLF connect highway is multipled to its marker connect relays MC in each OLF. A marker will connect to a particular OLF by operating its marker connect relays MC in that frame. This action will close the markers OLF connect highway to the selected frame. This action permits the marker to then operate the frame connect relays in the frame. The operation of the marker connect relays MC also signals the other markers that the frame is busy and also closes resistance ground to the frame H leads.

The purpose of the marker is to establish cross matrix paths between trunks connected to the inlets and outlets of the crosspoint matrix or switching network. The marker is divided into a number of functional circuits, some of which interface with highways to other subsystems and others which connect only within the marker. For the purpose of the present invention, the only one of these functional circuits of interest is the matrix pull and check (MPC) circuit which interfaces with the switch, link and junctor P leads in both the TLF and the OLF. The matrix pull and check MPC contains the P lead drivers which apply pull battery and pull ground to the TSP, TJP, OSP and OJP respectively and BSI's and GSI's which detect the present battery or ground on the T/OSP and T/OJP leads (switch P and junctor P) respectively, as more fully described below.

Generally, for the purpose of briefly describing the operation of the markers in establishing a cross matrix path, the markers access the switching network to switch a call by requesting permission to access the TLF on which the incoming trunk is terminated and a designated OLF on which an idle trunk to the desired destination is terminated. When a marker receives permission, it will connect its TLF and OLF highways to the selected TLF and OLF by operating its connect relays MC in the selected frame. Only one marker is permitted to access a particular TLF or OLF at a time.

More particularly, the operation is generally as follows. When given permission, a marker will operate its marker connect relays MC in the TLF. This action will connect the markers 200 lead TLF highway to the frame and the TLF will look busy to other markers. The marker will then operate the frame connect relays (relays SC, LCB and JCP) in the frame to bring into the marker the groups of P and H leads to be used in selecting and pulling a path across the TLF for the call.

Thereafter, when given permission, a marker will operate its marker connect relays MC in the OLF. This action will connect the markers 200 lead OLF highway to the frame and will make the OLF look busy to the other markers. The marker will then operate the frame connect relays (relays SC, LCB and JCP) in the OLF to bring into the marker the groups of P, H and IT lead required to switch the call.

When an idle cross matrix path has been selected the marker will pull the matrix by applying ground to the P lead (TJP) of the selected junctor and to the P leads (TSP and OSP) of the matrix inlet and outlet. The junctor P lead selected will be one of the 10 connected to the marker as a result of the path selection. The inlet P lead will be the P lead corresponding to the incoming trunk and one of the 10 connected to the marker by the operation of the switch connect relay SC in the TLF. The outlet P lead will be the P lead corresponding to the outgoing trunk and one of the 10 P leads connected to the marker by the operation of the switch connect relay SC in the OLF.

The markers are controlled by a sequence and supervisory control circuit SSC which causes them to advance through various sequence states. A marker may be in only one sequence state at a time.

As indicated above, due to the nature of the crosspoint matrix or switching network, any resulting faults in the matrix, if undetected and reported, would cause serious degradation of the switching network. The marker pull and check circuit MPC operates to detect and report faults in the switching network, to insure the customer a trouble-free path through the switching network and to eliminate the possibility of double connections. The MPC performs the following tests, in a manner described below:

a. foreign potential
b. multi-path (shorted leads)
c. shorted diodes
d. open diodes
e. pull check
f. hold check
g. transmission continuity.

If any one or more of these tests fail, a marker will not use the path, will report the trouble and then select another path.

More particularly, upon completion of the selection of an idle cross matrix path, the MPC performs specific tests to insure the integrity of the path that the marker is to establish. These test are enabled and controlled by the sequence and supervisory control circuit SSC.

Referring now to the drawings, as indicated above, when an idle cross matrix path has been selected, the TLF switch pull lead TSP, the OLF switch pull lead OSP, the TLF junctor pull lead TJP and the OLF junctor pull lead OJP all are connected to the marker. The SSC alternately connects battery sensor interface circuits BSI to the switch pull leads TSP and OSP, and ground sensor interface circuits GSI to the junctor pull leads TJP and OJP, to perform a foreign potential check. If there is a potential, battery or ground, on any pull lead or leads, their associated BSI or GSI will operate. The MPC contains the logic which interprets the condition of these GSI's and BSI's and catagorizes fault conditions for signaling the SSC and the trouble recorder, to indicate a P lead failure.

If no failure is indicated, the SSC advances the sequence state and the marker is caused to perform a shorted diode test. If this test is successful, the sequence state again is advanced and the marker is caused to perform a multipath test. These two tests can be optionally skipped during the normal marker test cycle, by operating a key switch at a marker test panel (MTP) (not shown). With this key switch in the normal (off) position, the MPC performs these tests.

The shorted diode test is performed in two steps, and only diodes directly related to the chosen path are tested. During the first step, the A and C stages of the matrix are tested, and during the second step, the B and D stages are tested. The GSI and BSI circuits are used to perform these tests.

More particularly, to test the A and C stages, a link GSI is switched to connect to each TLF link P lead TLP and a link BSI to each OLF link P lead OLP. The TLP switch pull leads TSP and the OLF junctor pull leads OJP are connected to the BSI's and GSI's respectively. The inputs of the BSI's and GSI's thus are connected together via the TLF primary switch PS and the OLF primary switch PS P leads. A BSI and a GSI both operate when their inputs are connected together, the GSI geing a battery source to the BSI and the BSI being a ground source to the GSI.

The polarity of the matrix diodes D1 and D3 is such that the current is blocked, and under no fault conditions, no BSI or GSI operates. A shorted diode, however, provides a current path which causes the corresponding GSI and BSI to operate, and the MPC generates a P lead fail signal, to the trouble recorder.

To test the B and D stages, during the next sequence state, the link GSI's are switched to the OLF link P leads OLP and the link BSI's to the TLF link P leads TLP. These switches are accomplished by means of relays such as the relays R1–R4, and is for the purpose of minimizing the number of sensors required to test the 20 trunk and 20 office link P leads TLP and OLP, by switching the sensors from one set of leads to another. This operation places a reverse bias to the diodes D2 and D4 in the TLF and OLF secondary switches SS. A shorted diode enables its corresponding BSI and GSI to operate, and the MPC generates a P lead fail signal to the trouble recorder.

The multi-path test is enabled by the SSC during the next following sequence state, and is performed in two tests. The first test checks the B and D stages, and the second test checks the A and C stages.

To test the B and D stages, the link GSI's are connected to the TLF link pull leads TLP and the link BSI's to the OLF link pull leads OLP. The SSC circuit enables pull battery and pull ground to the OLF switch pull lead OSP and the TLF junctor pull lead TJP, respectively, associated with the selected cross matrix path. If no fault exists, only the GSI's on the junctor pull lead TJP and the link pull lead TLP of the chosen or selected path in the TLF will operate, and only the BSI's on the switch pull lead OSP and the link pull lead OLP of the selected path in the OLF will operate. If any other GSI or BSI operates, a multiple path fault exists in the matrix, and the MPC generates a P lead fail signal to the trouble recorder.

To test the A and C stages, the link BSI's are switched to the leads TLP and the GSI's to the leads OLP. The SSC applies pull battery to the selected TLF switch pull lead TSP and pull ground to the selected OLF junctor pull lead OJP. If no fault exists, only the GSI's and BSI's associated with the selected path will operate. Again, if any other GSI or BSI operates, a multiple path fault exists in the matrix and the MPC will generate a P lead fail signal to the trouble recorder.

The full selected cross matrix path is pulled simultaneously, but the actual pulling of the crosspoints of the switches in the TLF and OLF are done independently of each other.

To pull the cross matrix path, the SSC causes the ground connected relays TLF PULL-CK and OLF PULL-CK to be connected to the selected TLF and OLF junctor pull leads TJP and OJP, via the TLF junctor P lead driver and the OLF junctor P lead driver, and pull battery is applied to the selected TLF and OLF switch pull leads TSP and OSP, via the TLF inlet P lead driver and the OLF outlet P lead driver. This places each ground connected PULL-CK relay in series with its TLF or OLF primary and secondary switch correed coils to battery. If the selected path is good, both of the TLF and OLF PULL-CK relays will operate.

During the next sequence state, the marker checks the continuity of the transmission path. The T, R, EC and H leads of the matrix inlet are connected to the marker's MPC circuit via the incoming trunk, the Register-Sender, the Register-Sender Access Switch, and the Register-Sender-to-Marker highway.

In a two-wire switch, the outgoing trunk, prior to cut-through, has a 600 ohm resistor bridging its transmission (T and R) leads. In a four-wire switch, the outgoing trunk connects its two transmission pairs together and the incoming trunk has a 600 ohm resistor bridging its T and R leads. In either case, the T and R leads of the incoming trunk appears to the MPC Transmission Continuity Test circuit TCT. If the path continuity is good, the 600 ohm resistor will be detected by the TCT. Open, shorted or grounded transmission leads will be indicated as a continuity failure to the trouble recorder.

The EC lead is checked for battery or ground by connecting the input circuit of a BSI and GSI circuit together, within the EC lead continuity check circuit CCC. If either circuit operates, continuity exists between the incoming trunk and the outgoing trunk's SV relay. If both the BSI and GSI circuits operate, the EC lead is opened.

A BSI circuit within the H lead continuity check circuit HCC is used to detect continuity on the hold or H lead. If the BSI operates, continuity exists from the incoming trunk to the battery connected H relay in the outgoing trunk circuit.

If any of the above tests fail, the fault is indicated to the trouble recorder via the continuity failure trouble reporting circuit TRC.

The holding of the cross matrix path is checked by connecting a ground connected HOLD-CHECK relay within the H hold check circuit HCC to the H lead. This HOLD-CHECK relay checks the matrix hold path via the Register-Sender, the matrix correeds hold windings, and contacts to a battery connected H relay in the outgoing trunk. The operation of the HOLD-CHECK relay will indicate continuity on the hold path and allows the SSC circuit to remove the battery and ground from the pull lead circuit.

If the HOLD-CHECK relay remains operated after the removal of the pull potential, it indicates that the path has been successfully held. A failure is indicated to the trouble recorder, via the hold failure trouble reporting circuit HFT.

It will thus be seen that the objects set forth above, among those made apparent from the preceding description, are efficiently attained and certain changes may be made in carrying out the above method. Accordingly, it is intended that all matter contained in the above description shall be interpreted as illustrative and not in a limiting sense.

Now that the invention has been described, what is claimed as new and desired to be secured by Letters Patent is:

1. In a communication switching system including a switching network for establishing connections between a first set of terminals and a second set of terminals, said switching network having a plurality of switching stages arranged in tandem between terminals of the first set and terminals of the second set, said plurality of switching stages including a primary and a secondary switching stage included within a trunk link frame and a primary and secondary switching stage included within an office link frame, each of said stages comprising a plurality of relays arranged in coordinate arrays, each relay having an operate winding and a hold winding with a unidirectional device individual to each of said relays and connected in series with the operate winding thereof at the coordinate points of each of said arrays, each relay having a normally open set of its own contacts connected in series with its hold winding, there being trunk links and office links interconnecting the respective primary and secondary stages, each link including an operate conductor interconnecting the series combination of the operate winding and unidirectional device and a hold conductor interconnecting the series combination of the hold winding and normally open contacts of a relay in each of the adjacent stages, busy trunk links and office links having the hold path contacts closed at each end and having holding current flowing through the hold windings so that a given potential appears on the hold conductor, trunk switch pull leads coupled to said operate windings of said relays in said primary switching stage in said trunk link frame, trunk link pull leads coupled to said operate conductors of said trunk links in said trunk link frame, trunk junctor pull leads coupled to said operate windings of said relays in said secondary stage in said trunk link frame, office switch pull leads coupled to said operate windings of said relays in said secondary switching stage in said office link frame, office link pull leads coupled to said operate conductors of said office links in said office link frame, trunk junctor pull leads coupled to said operate windings of said relays in said primary switching stage in said office link frame, marker apparatus for applying a first marking potential to said trunk switch pull lead and said office switch pull lead and a second marking potential to said trunk junctor pull lead and said office junctor pull lead of a selected path which produces a potential difference in the forward direction of said unidirectional devices between the two selected terminals through a series path including the operate winding of one coordinate point relay of each of said stages which causes said relays in the path between the selected terminals to operate and thereby establish a communication path, a holding circuit being then completed in series through the hold windings and said series contacts of the relays in the established path, and means effective subsequent to the establishment of the holding path for removing said marking potentials and thereby open the operate circuit, an arrangement for detecting faults in said switching network using said marker comprising within said marker a pull lead driver and a battery sensor interface circuit associated with each of said trunk switch pull leads, a pull lead driver and a ground sensor interface circuit associated with each of said trunk junctor pull leads, a battery and a ground sensor interface circuit associated with each of said trunk and office link pull leads, a pull lead driver and a ground sensor interface circuit associated with each of said office junctor pull leads, a pull lead driver and a battery sensor interface circuit associated with each of said office switch pull leads, said battery and ground sensor interface circuits being operated responsive to a battery potential and a ground potential respectively, means for connecting said battery sensor interface circuits to said trunk and office switch pull leads of a selected path, a battery potential on any one or more of said switch pull leads causing said battery sensor interface circuit associated with said switch pull lead to operate, and means responsive to the operation of a battery sensor interface circuit to indicate a pull lead failure, whereby tests for foreign battery potentials on said pull leads of a selected path can be made by connecting said battery sensor interface circuits to said trunk and office switch pull leads.

2. In a communication switching system, the arrangement of claim 1 for detecting faults in said switching network further comprising means for connecting said ground sensor interface circuits to said trunk and office junctor pull leads of a selected path, a ground potential on any one or more of said junctor pull leads causing said ground sensor interface circuit associated with said junctor pull lead to operate, and means responsive to the operation of a ground sensor interface circuit to indicate a pull lead failure, whereby tests for foreign ground potentials on said pull leads of a selected path can be made by connecting said ground sensor interface circuits to said trunk and office junctor pull leads.

3. In a communication switching system, the arrangement of claim 1 for detecting faults in said switching network further comprising means operable to connect said battery sensor interface circuit to said trunk switch pull lead of a selected path and said ground sensor interface circuit to said trunk link pull lead of a selected path to thereby connect together the inputs of said battery and ground sensor interface circuits via the pull lead of said primary switching stage of said trunk link frame, said ground sensor interface circuit being a battery source to said battery sensor interface circuit and said battery sensor interface circuit being a ground source to said ground sensor interface circuit to thereby cause them to operate, the polarity of said unidirectional devices normally being such as to block current flow and thereby preventing said battery and ground sensor interface circuits from operating, a shorted unidirectional device providing a current path which causes said battery and ground sensor interface circuits to operate and thereby indicate a failure of the unidirectional device of said primary switching stage of said trunk link frame, whereby the proper operation of said unidirectional devices of a selected path in said primary switching stages of said trunk link frame can be tested.

4. In a communication switching system, the arrangement of claim 1 for detecting faults in said switching network, further comprising means operable to connect said ground sensor interface circuit to said office junctor pull lead of a selected path and said battery sensor interface circuit to said office link pull lead of a selected path to thereby connect together the inputs of said battery and ground sensor interface circuits via the pull lead of said primary switching stage of said office link frame, said ground sensor interface circuit being a battery source to said battery sensor interface circuit and said battery sensor interface circuit being a ground source to said ground sensor interface circuit to thereby cause them to operate, the polarity of said unidirectional devices normally being such as to block current flow and thereby prevent said battery and ground sensor interface circuits from operating, a shorted unidirectional device providing a current path which causes said battery and ground sensor interface circuits to operate and thereby indicate a failure of the unidirectional device of said primary switching stage of said office link frame, whereby the proper operation of said unidirectional devices of a selected path in said primary switching stages of said office link frame can be tested.

5. In a communication switching system, the arrangement of claim 4 for detecting faults in said switching network, wherein proper operation of said unidirectional devices of a selected path in said primary stages of both said trunk and office link frames are simultaneously tested.

6. In a communication switching system, the arrangement of claim 1 for detecting faults in said switching network, further comprising means operable to connect said battery sensor interface circuit to said trunk link pull lead of a selected path and said ground sensor interface circuit to said trunk junctor pull lead of a selected path to thereby connect the inputs of said battery and ground sensor interface circuits via the pull lead of said secondary switching stage of said trunk link frame, said ground sensor interface circuit being a battery source to said battery sensor interface circuit and said battery sensor interface circuit being a ground source to said ground sensor interface circuit to thereby cause them to operate, the polarity of said unidirectional devices normally being such as to block current flow and thereby prevent said battery and ground sensor interface circuits from operating, a shorted unidirectional device providing a current path which causes the associated ones of them to operate and thereby indicate a failure of the unidirectional device of the selected path in said secondary switching stage of said trunk link frame, whereby the proper operation of said unidirectional devices of said selected path in said secondary switching stages of said trunk link frame can be tested.

7. In a communication switching system, the arrangement of claim 6 for detecting faults in said switching network, further comprising means operable to connect said ground sensor interface circuit to said office link pull lead of a selected path and said battery sensor interface circuit to said office switch pull lead of a selected path to thereby connect together the inputs of said battery and ground sensor interface circuits via the pull lead of said secondary switching stage of said office link frame, said ground sensor interface circuit being a battery source to said battery sensor interface circuit and said battery sensor interface circuit being a ground source to said ground sensor interface circuit to thereby cause them to operate, the polarity of said unidirectional devices normally being such as to block current flow and thereby prevent said battery and ground sensor interface circuits from operating, a shorted unidirectional device providing a current path which causes them to operate and thereby indicate a failure of the unidirectional device of the selected path in said secondary switching stages of said office link frame, whereby the proper operation of said unidirectional devices of said selected path in said secondary switching stages of said office link frame can be tested.

8. In a communication switching system, the arrangement of claim 7 for detecting faults in said switching network, wherein the proper operation of said unidirectional devices of a selected path in said secondary stages of both said trunk and office link frames are simultaneously tested.

9. In a communication switching system, the arrangement of claim 8 for detecting faults in said switching network, further including relay means operable to switch said ground sensor interface circuit and said battery sensor interface circuit associated with said trunk and office link pull leads to alternately connect them to said trunk and office link pull leads, whereby the same battery and ground sensor interface circuits can be used to test the proper operation of the unidirectional devices in both said primary and secondary switching stages.

10. In a communication switching system, the arrangement of claim 1 for detecting faults in said switching network, further comprising means operable to connect said ground sensor interface circuits to said trunk link pull leads and to said trunk junctor pull leads and to connect said battery sensor interface circuits to said office link pull leads and to said office switch pull leads, said means further being operable to connect said pull lead driver to said office switch pull lead of a selected path to apply a pull battery potential to it to cause said battery sensor interface circuits connected to said office link and switch leads of said selected path to operate and to connect said pull lead driver to said trunk link pull lead of a selected path to apply a pull ground potential to it to cause said ground sensor interface circuits connected to said trunk link and junctor pull leads of said selected path to operate, the operation of any one or more of the other ones of said battery and ground sensor interface circuits indicating a multiple path fault within one of said secondary switching stages of said trunk link frame and said office link frame of said switching network, the operation thereof being detected and the fault being reported.

11. In a communication switching system, the arrangement of claim 1 for detecting faults in said switching network, further comprising means operable to connect said battery sensor interface circuits to said trunk switch and junctor pull leads and to connect said ground sensor interface circuits to said office link and junctor pull leads, said means further being operable to connect said pull lead driver to said trunk switch pull lead of a selected path to apply a battery pull potential to it to cause said battery sensor interface circuits connected to said trunk switch and junctor pull leads of said selected path to operate and to connect said pull lead driver to said office junctor pull lead of a selected path to apply a pull ground potential to it to cause said ground sensor interface circuits connected to said office link and junctor pull leads of said selected path to operate, the operation of any one or more of the other ones of said battery and ground sensor interface circuits indicating a multiple path fault within one of said primary switching stages of said trunk link frame and said office link frame of said switching network, the operation thereof being detected and the fault reported.

12. In a communication switching system, the arrangement of claim 10 for detecting faults in said switching network, further comprising means operable to connect said battery sensor interface circuits to said trunk switch and junctor pull leads and to connect said ground sensor interface circuits to said office link and junctor pull leads, said means further being operable to connect said pull lead driver to said trunk switch pull lead of a selected path to apply a battery pull potential to it to cause said battery sensor interface circuits connected to said trunk switch and junctor pull leads of said selected path to operate and to connect said pull lead driver to said office junctor pull lead of a selected path to apply a pull ground potential to it to cause said ground sensor interface circuits connected to said office link and junctor pull leads of said selected path to operate, the operation of any one or more of the other ones of said battery and ground sensor interface circuits indicating a multiple path fault within one of said primary switching stages of said trunk link frame and said office link frame of said switching network, the operation thereof being detected and the fault reported.

13. In a communciation switching system, the arrangement of claim 1 for detecting faults in said switching network, further comprising a pair of ground connected pull check relays connectable respectively to said trunk link pull lead and said office link pull lead of a selected path and a pull battery potential connectable to said trunk switch pull lead and said office switch pull lead of the selected path, whereby each of said pull check relays is connected in series with the pull leads of its primary and secondary switching stages of the respective trunk link frame and office link frame and will operate if said selected path is good, the failure of a pull check relay to operate indicating that the selected path is faulty.

14. In a communication switching system, the arrangement of claim 1 for detecting faults in said switching network, wherein said communication path includes a pair of transmission leads, said pair of transmission leads at the inlet of said switching network being coupled to said marker via an incoming trunk, a register-sender, a register-sender access switch, a register-sender-to-marker highway and having resistance means bridging them prior to cut-through, said arrangement further comprising a continuity test circuit to which said pair of transmission leads are connected, said continuity test circuit detecting said resistance means if the continuity of said pair of transmission leads is good, the failure of said continuity test circuit in detecting said resistance means indicating that said pair of transmission leads is open, shorted or ground.

15. In a communication switching system, the arrangement of claim 1 for detecting faults in said switching network, wherein said communication path includes a control lead connected through said trunk and office link frames to a relay in an outgoing trunk, said control lead at the inlet of said switching network further being coupled to said marker via an incoming trunk, a register-sender, a register-sender access switch, a register-sender-to-marker highway, said arrangement further comprising a battery and a ground sensor interface circuit having the inputs thereof connected togehter and to said control lead, one of said battery and ground sensor interface circuits being operated if continuity exists between said incoming trunk and said relay in said outgoing trunk, both of said battery and ground sensor interface circuits being operated if said control lead is opened, the operation of both of said battery and ground sensor interface circuits being detected and the control lead fault being thereby detected.

16. In a communication switching system, the arrangement of claim 1 for detecting faults in said switching network, wherein said holding circuit includes a battery connected relay in an outgoing trunk circuit and wherein said holding circuit at the inlet of said switching network is coupled via an incoming trunk, a register-sender, a register-sender access switch, a register-sender-to-marker highway to said marker, said arrangement further comprising a battery sensor interface circuit connectable to said hold circuit, the operation of said battery sensor interface circuit indicating continuity of said hold circuit from said incoming trunk to said battery connected relay in said outgoing trunk, said battery sensor interface circuit upon failing to operate indicating a fault condition in said hold circuit.

17. In a communication switching system, the arrangement of claim 1 for detecting faults in said switching network, wherein said holding circuit includes a battery connected relay in an outgoing trunk circuit and wherein said holding circuit at the inlet of said switching network is coupled via an incoming trunk, a register-sender, a register-sender access switch, a register-sender-to-marker highway to said marker, said arrangement further comprising a ground connected hold check relay connectable to said holding circuit, said hold check relay being operated and indicating continuity of said holding circuit, said hold check relay upon remaining operated after said marking potentials have been removed indicating that said communication path has been successfully held.

* * * * *